United States Patent [19]

Nishida et al.

[11] Patent Number: 5,505,496
[45] Date of Patent: Apr. 9, 1996

[54] AUTOMATIC PIPELINE SWITCHING DEVICE

[75] Inventors: Kazuhiro Nishida; Hirokazu Saito; Kunihiko Fukawa; Kiyokazu Fujiwara, all of Shizuoka, Japan

[73] Assignee: Fuji Photo Film Co., Ltd., Kanagawa, Japan

[21] Appl. No.: 327,697

[22] Filed: Oct. 24, 1994

[30] Foreign Application Priority Data

Oct. 29, 1993 [JP] Japan .................... 5-292370

[51] Int. Cl.⁶ .................. F17D 3/03; F16L 41/00
[52] U.S. Cl. .................. 285/25; 285/26; 285/131; 354/297
[58] Field of Search .................. 285/25, 26, 28, 285/131; 354/297, 324

[56] References Cited

U.S. PATENT DOCUMENTS

| | | | |
|---|---|---|---|
| 4,790,568 | 12/1988 | Skibowski | 285/28 |
| 5,160,173 | 11/1992 | Le Devehat | 285/26 |
| 5,181,749 | 1/1993 | Feichtiger et al. | 285/26 |
| 5,294,154 | 3/1994 | Le Devehat | 285/26 |

FOREIGN PATENT DOCUMENTS

| | | | |
|---|---|---|---|
| 4-157287 | 5/1992 | Japan | 285/26 |
| 5-180382 | 7/1993 | Japan | 285/25 |
| 5-215300 | 8/1993 | Japan . | |
| 6-56200 | 3/1994 | Japan | 285/26 |
| 855325 | 8/1981 | U.S.S.R. | 285/26 |
| 2208088 | 2/1989 | United Kingdom | 285/25 |

*Primary Examiner*—Eric K. Nicholson
*Attorney, Agent, or Firm*—Sughrue, Mion, Zinn, Macpeak & Seas

[57] ABSTRACT

In an automatic pipeline switching device, first connecting joints of a plurality of material receiving pipes are arranged in one line in an X-axis direction, and second connecting joints of a plurality of material feeding pipes are held at a standby region such that they are arranged in one line in a Z-axis direction perpendicular to the X-axis direction. The feeding pipes include rigid pipes extending in a Y-axis direction perpendicular to the X-axis and Z-axis directions, first flexible hoses extending in the Z-axis direction, and second flexible hoses extending in the X-axis direction. The rigid pipes, first flexible hoses and second flexible hoses are connected, in the stated order, to the second connecting joints, respectively. The rigid pipes are arranged in the standby region, and made larger in length with increasing distance from an origin of the X-axis, the Y-axis and Z-axis to prevent interference of the flexible hoses with each other. A device is provided for moving the holder, in the X-axis and Z-axis directions, to the standby region, where the holder picks up a selected one of the second connecting joints, and moves it to a selected one of the first connecting joints to be connected therewith.

5 Claims, 3 Drawing Sheets

AUTOMATIC PIPELINE SWITCHING DEVICE

BACKGROUND OF THE INVENTION

This invention relates to a system which continuously supplies a number of kinds of solution materials from material storing tanks to a preparing/mixing device, and more particularly to a device for automatically switching a destination to which the solution materials are to be supplied.

Heretofore, in order to switch the destination of a number of kinds of solution materials, the connection of the material supply pipe is manually changed to provide another material supply pipeline. This work is rather troublesome. In order to eliminate the troublesome work, a method as shown in FIG. 6 is employed: That is, in the method, a number of valves are connected to the pipelines, and the valves thus connected are automatically operated to provide different material supply pipelines.

The former method mentioned above is disadvantageous in the following points:

(1) Because of the manual work, the pipes may be erroneously connected.

(2) Because of the manual work, it takes a certain period of time to accomplish it.

(3) In order to prevent the erroneous connection of the pipes (described in paragraph (1) above), it is necessary to detect whether or not the connection of the pipes is satisfactory.

(4) The necessity for detecting whether or not the connection of the pipes is acceptable (described in paragraph (3) above) further increases work load and time.

The latter method mentioned above suffers from the following problems:

(1) The resultant product may be unacceptable because of contamination due to the leakage of solution through the valves. The probability of this difficulty occurring is proportional to the number of pipes and valves.

(2) The equipment cost is great. For instance in the case where one hundred (100) kinds of chemicals are used by switching thirty (30) piping systems depending on the kinds of products to be manufactured, it is necessary to provide three thousand (3000) automatic valves, and electromagnetic valves for operating the latter.

(3) Since the pipes are extended between the material storing tanks and the solution preparing/mixing devices, the pipes filled with the solution materials are considerably long. This means that replacing the solution materials in the material storing tanks suffers unavoidably from a great loss of solution materials.

(4) Since the material storing tanks are connected through the pipes to the solution preparing/mixing devices, the pipes filled with the solution materials are long. Hence, in replacing the solution materials in the material storing tanks, cleaning the pipes and the tanks takes a relatively long time.

In order to eliminate the above-described difficulties, a device for automatically achieving the connection of flexible pipes such as hoses has been disclosed by Japanese Patent Application (OPI) No. 215300/1993 (the term "OPI" as used herein means an "unexamined application").

With the conventional device, one of the connecting joints of two hoses to be connected to each other is moved vertically, while the other is moved horizontally, until they are connected to each other.

However, the device is still disadvantageous in the following points:

(1) In the case where the device is so designed that an electric motor is provided for each of the moving units, it is necessary to provide as many motors, ball screws and control units as the number of hoses.

(2) In the case where, in each unit, one electric motor or pneumatic cylinder is moved; that is, it is used commonly, the number of drive sources may be two; however, it is necessary to provide as many clutch mechanism connecting/disconnecting means and position control means as the hoses to be connected.

Those problems are serious in proportion to the increasing number of hoses. For instance in the case where the device has more than thirty (30) pipelines, the device is unavoidably bulky, and is troublesome in maintenance.

In view of the foregoing, an object of the invention is to provide an automatic pipeline switching device which is free from the problem that, in changing the destination to which a number of kinds of solution materials are to be supplied during continuous production, changing the material supply pipeline takes a lot of time and labor, and which is able to handle a number of pipelines effectively, and is compact in arrangement and simple in maintenance.

The foregoing object of the invention has been achieved by the provision of an automatic pipeline switching device, which, according to the invention, comprises:

a plurality of material receiving pipes connected respectively to a plurality of material storing tanks;

a plurality of material feeding pipes connected respectively to a plurality of solution preparing/mixing devices;

a holder for holding the connecting joints of the material feeding pipes; and means for moving the holder in a direction of Z-axis and in a direction of X-axis, and in which device the connecting joints of the material receiving pipes are arranged in one line in the direction of X-axis, the connecting joints of the material feeding pipes are held at a standby region in such a manner that the connecting joints of the material feeding pies are arranged in one line in the direction of Z-axis, rigid pipes in parallel with Y-axis, flexible hoses in parallel with Z-axis, and flexible hoses in parallel with X-axis are connected, in the stated order, to the connecting joints of the material feeding pipes, respectively, with the free ends of the flexible hoses in parallel with X-axis connected to the solution preparing/mixing devices, the rigid pipes are arranged in the standby region and made larger in length towards the top of the standby region to prevent interference of the flexible hoses in parallel with Z-axis and the flexible hoses in parallel with X-axis with each other, and the moving means operates to move the holder to the standby region, where the holder holds the connecting coupling of a selected one of the material feeding pipes, and then to move the holder to the connecting coupling of a selected one of the material receiving pipes, for connection of those connecting couplings to each other.

DETAILED DESCRIPTION OF THE PREFERRED EMBODIMENTS

Figure 2:
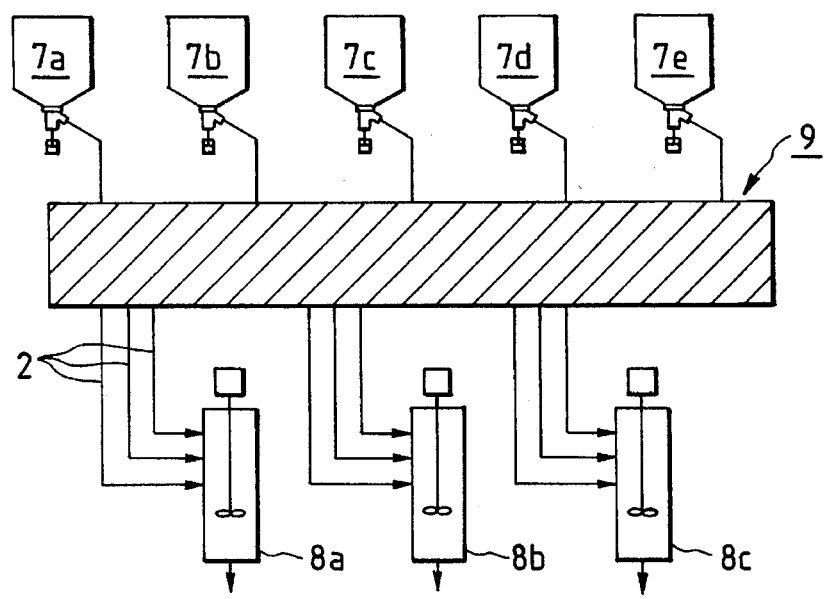
FIG. 2 is an explanatory diagram for a description of processes performed by the device of the invention.

FIG. 2 is a diagram for a description of processes performed by an automatic pipeline switching device according to the invention. In FIG. 2, reference numeral 9 designates the automatic pipeline switching device according to the invention. Solution materials stored in a plurality of material storing tanks 7 are supplied through the automatic pipeline switching device 9 to a selected one of the preparing/mixing devices 8. When it is required to change the destination of the solution materials, the device 9 of the invention automatically changes the connection of the material supply pipeline according to an instruction from a control unit.

Figure 1:
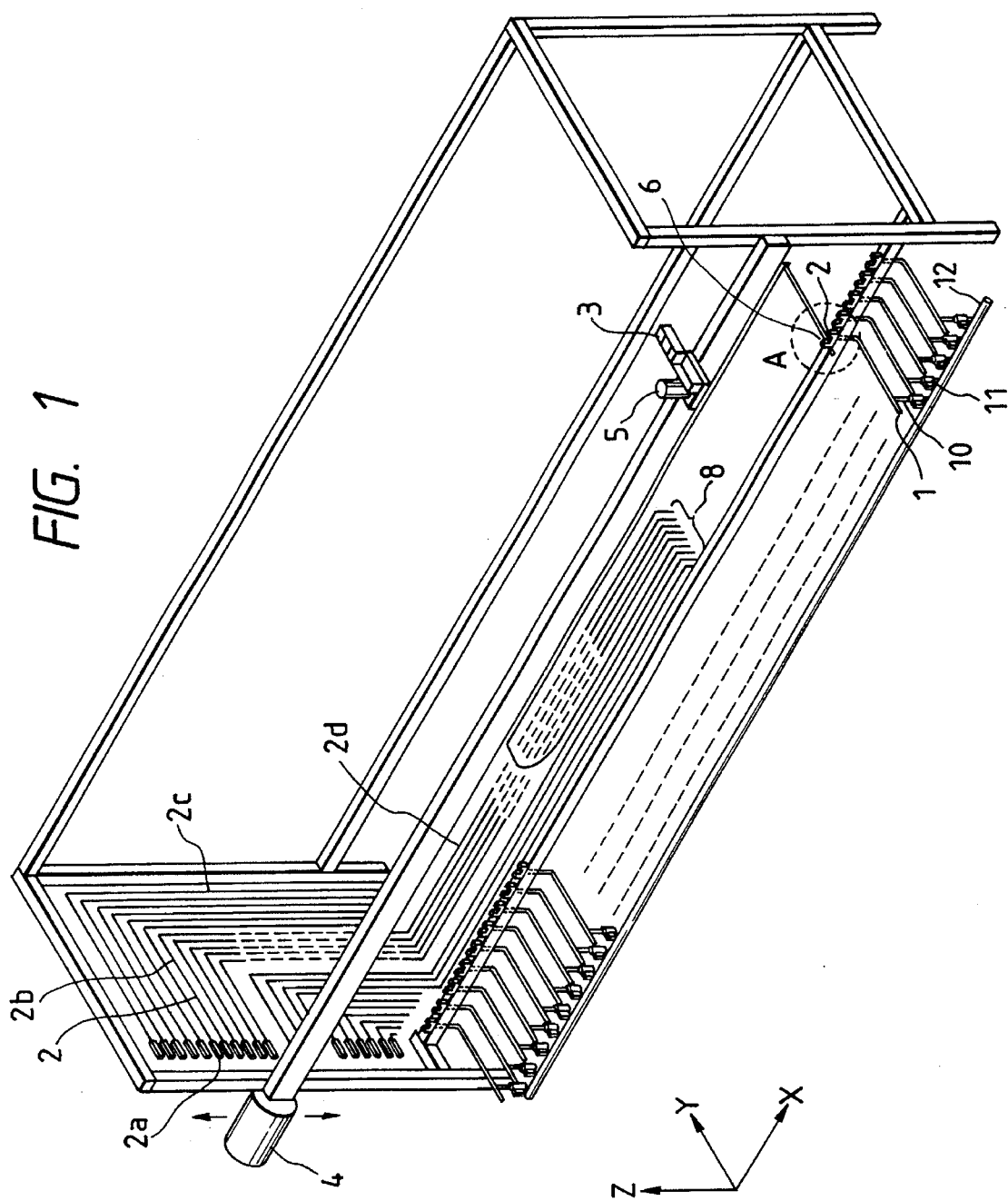
FIG. 1 is a perspective view showing the arrangement of an automatic pipeline switching device according to the invention.

FIG. 1 is a perspective view of the automatic pipeline switching device 9 of the invention. The automatic pipeline switching device 9 comprises: material receiving pipes 1 for receiving the solution materials from the material storing tanks 7; material feeding pipes 2 for delivering the solution materials to the preparing/mixing devices; a holder 3 for holding the connecting joint 2a of a selected one of the material feeding pipes (hereinafter referred to as "a material-feeding-pipe's connecting joint 2a", when applicable); a Z-direction moving unit 4 for moving the holder 3 in the direction of Z-axis; an X-direction moving unit 5 for moving the holder 3 in the direction of X-axis; and pipe connecting/disconnecting units 6 each of which is operated to connect the connecting joint 1a of a selected one of the material receiving pipes (hereinafter referred to as "a material-receiving-pipe's connecting joint 1a", when applicable) to a selected material-feeding-pipe's connecting joint 2a to form a material flow path.

The number of material receiving pipes 1 is equal to that of the material storing tanks. Each of the material receiving pipes 1 has the material-feeding-pipe's connecting joint 2a and the pipe connecting/disconnecting unit 6 at one end, and the other end is connected to the respective material storing tank.

Figure 3:
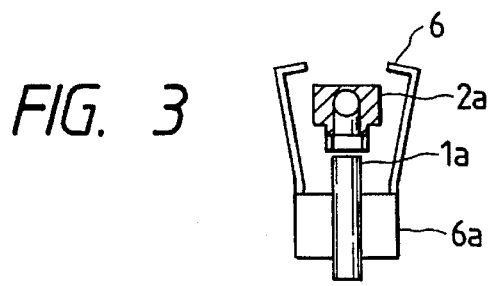
FIGS. 3 and 4 are a front view and a side view, respectively, showing a pipe connecting/disconnecting unit which disengages connecting joints from each other.
Figure 4:
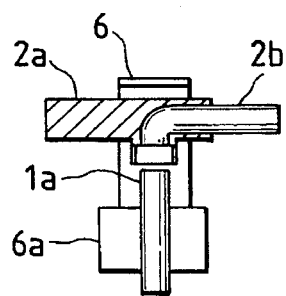
Figure 5:
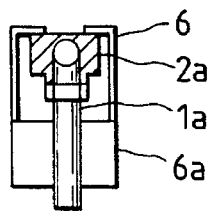
FIG. 5 is a front view showing the pipe engaging/disengaging unit which engages the connecting joints with each other.
Figure 6:
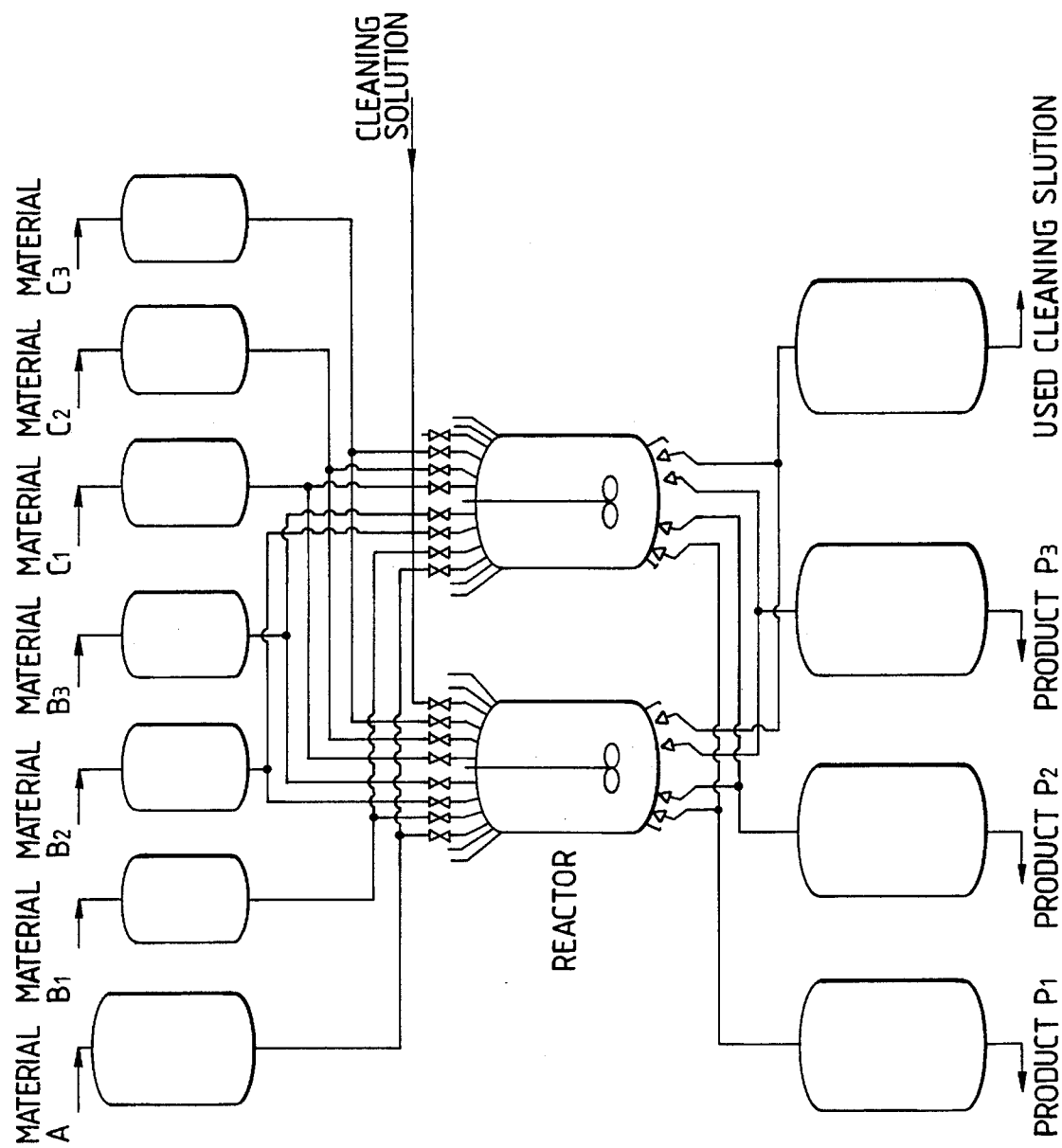
FIG. 6 is an explanatory diagram for a description of a conventional method of using valves to change the connections of material supply pipelines.

FIGS. 3 through 5 show the connecting position A of one of the material receiving pipes 1, where the material-receiving-pipe's connecting joint 1a is connected to or disconnected from the material-feeding-pipe's connecting joint 2a.

More specifically, FIGS. 3 and 4 show the disengagement of the connecting joints 1a and 2a, and FIG. 5 shows the engagement of them. In FIGS. 3 through 5, reference character 6a designates a driving section in each of the pipe connecting/disconnecting units 6. The drive section 6a may be provided according to a conventional method using pneumatic energy or electrical energy.

As shown in FIG. 5, the pipe connecting/disconnecting unit 6, being driven by the driving section 6a, holds the material-feeding-pipe's connecting joint 2a and pushes the back of the material-receiving-pipe's connecting joint 1a until the seal surfaces of those connecting joints 1a and 2a are in close contact with each other, thus forming a material flow path.

The number of the material feeding pipes 2 is equal to that of the material feeding pipes of the material preparing/mixing devices through which the materials are delivered out. Each of the material feeding pipes 2 is made up of the connecting joint 2a which is to be connected to the material receiving pipe, a solid pipe 2b in parallel with Y-axis, a flexible hose 2c in parallel with Z-axis, and a flexible hose 2d in parallel with X-axis, which are connected to one another in the stated order. The free end of the flexible hose 2d is connected to the respective material preparing/mixing device. The rigid pipe 2b in parallel with the Y-axis is arranged in a Y-Z plane. The rigid pipes 2b thus arranged are larger in length upwardly, which prevents the interference of the flexible hoses in parallel with Z-axis and the flexible hoses in parallel with X-axis with each other. The flexible hoses 2c and 2d are supported with wiring cable bearers or the like, so that they may not come off the X-Z planes during the movement of the rigid pipes 2b.

In connecting a selected one of the material-receiving-pipe's connecting joints 1a to a selected one of the material-feeding-pipe's connecting joints 2a to form a material flow path, the holder 3 set on the X-direction moving unit 5 is moved by the Z-direction moving unit 4 and the X-direction moving unit 5 to a standby position where the selected joint 2a is located. At the standby position, the holder 3 picks up the connecting joint 2a, and moves it until it is confronted with the predetermined material receiving pipe 1. Thereafter, the pipe connecting/disconnecting unit 6 operates to connect the material-receiving-pipe's connecting joint to the material-feeding-pipe's connecting joint, to form the material flow path. In connecting a number of material receiving pipes 1 to a number of material feeding pipes to form a number of material flow paths, the operation of holding, picking and moving a selected one of the connecting joints 2a by the holder 3, the operation of moving the holder in the direction of Z-axis and in the direction of X-axis by the moving units 4 and 5, and the operation of connecting a selected one of the material-receiving-pipe's connecting joints 1a to a selected one of the material-feeding-pipe's connecting joints 2a by the respective pipe connecting/disconnecting unit 6 are repeatedly carried out while the rigid pipes 2b forming the material feeding pipes 2 to be connected are selected successively beginning with the shortest one which is located lowermost in the direction of Z-axis.

The pipes thus connected are completely sealed. Under this condition, a compressed air of about 0.1 Mpa is applied to the pipes to detect whether or not the pressure therein changes, thereby to determine whether or not the pipes have been satisfactorily connected to each other.

When it is required to disconnect the material receiving pipe 1 from the material feeding pipe 2, the pipe connecting/disconnecting unit 6 operates to disconnect the connecting joint of the material receiving pipe 1 from the connecting joint of the material feeding pipe 2. Thereafter, the material feeding pipe 2 thus disconnected is returned to the original position with the aid of the holder 3, the Z-direction moving unit 4 and the X-direction moving unit 5.

When it is required to disconnect a number of material feeding pipes 2 from a number of material receiving pipes 1, the operations of disengaging the connecting joints by the pipe connecting/disconnecting units, and the operation of moving the connecting joints by the holder 3, the Z-direction moving unit 4, and the X-direction moving unit 5 are repeatedly carried out while the rigid pipes of the material feeding pipes 2 are selected successively beginning with the longest one which is located uppermost in the direction of Z-axis.

The pipes are cleaned with a cleaning solution supplied through cleaning-solution supplying pipes 10 which are connected to the material receiving pipes 1, respectively. As shown in FIG. 1, the cleaning-solution supplying pipes 10 are connected to a common cleaning solution header pipe 12. Valves 11 are operated with an optionally determined sequence, to clean each of the pipes.

(EXAMPLE)

The apparatus of the present invention is used for producing sixty-eight (68) kinds of photographic emulsion, and it is provided at an intermediate position between forty (40) material tanks storing forty (40) kinds of chemicals for photographic emulsion, such as macromolecular solution dissolved in distilled water or organic solution, and twenty-two (22) material feeding pumps. The apparatus connects some necessary material storing tanks of the forty (40) material storing tanks and material feeding pumps automatically by pipelines. The materials are fed by gravity from the material storing tanks to the material feeding pumps feeding. When it is necessary to switch paths from the material storing tanks and the material feeding pumps in order to switch the kind of materials to be fed, it is possible to switch the paths automatically by the apparatus. In the apparatus, at most twelve (12) of the material storing tanks are connected with the material feeding pumps corresponding to one kind of material. There are sixty-eight (68) kinds of patterns of paths and the same number (68) kinds of materials, since a pattern of path from a material storing tank to a material feeding pump varies corresponding to one material. Forty (40) material-receiving pipes 1 connected with forty (40) material storing tanks and twenty-two (22) material-feeding pipes 2 connected with twenty-two (22) material feeding pumps for feeding materials are provided in the apparatus. The diameter of the pipeline is 3424 mm in width, 2322.5 mm in height, and 1702 mm in depth. The quality of material of the material-receiving pipe 1 is SUS 316, and the size of pipe is ½ inches. The material-feeding pipe 2 comprises a rigid pipe 2b which is ½ inches in size and is made of SUS 316, and a flexible pipe which is ½ inches in size and is made of PTFE. It took 1 minute at most to connect one of the pipes 1 with one of the pipes 2. Further, it took 9 minutes and 30 seconds to connect twelve (12) of the pipes 1 with twelve (12) of the pipes 2. Compared with the conventional art by which it takes twenty-two (22) minutes to make the latter connection, it is possible to greatly shorten the time according to the present invention.

As described above, the material appropriately used in the present invention is photographical emulsion. The number of material storing tanks is from twenty (20) to sixty (60), the number of material feeding pumps is from ten (10) to forty (40), and the number of pattern of pipeline is from fifty (50) to a hundred (100). The diameter of the pipeline is usually from ⅛ to 1 inches.

As shown in the EXAMPLE, according to the present invention, it is possible to obtain an especial effect as follows.

(1) In manufacturing a variety of products, the destination of a number of kinds of solution materials can be automatically and correctly changed without a loss of time and labor.

(2) Chemicals harmful to human bodies can be automatically supplied to the solution preparing devices without touching the operator. With the device, cleaning the solution storing tanks and the pipes can be achieved within a short time.

(3) With the device, one holder, one X-direction moving unit, and one Z-direction moving unit are used to hold and move the material giving pipes one after another. Hence, the device of the invention is much smaller in the number of elements to be controlled and in the number of components than that which is provided according to the method of Japanese Patent Application (OPI) No. 215300/1993 or a system in which pipes are moved three-dimensionally. Thus, the device is low in equipment cost, and simple in maintenance.

(4) The connecting joints of the material receiving pipes are arranged in one line along the fixed X-axis, and therefore it can be visually determined it with ease whether or not the pipes have been connected satisfactorily and whether or not the leakage of solution from the pipes has occurred.

Having described our invention as related to the embodiment shown in the accompanying drawing, it is our intention that the invention not be limited by any of the details of description, unless otherwise specified, but rather be construed broadly within its spirit and scope as set out in the accompanying claims.

What is claimed is:

1. An automatic pipeline switching device, comprising:

a plurality of material receiving pipes connected respectively to a plurality of material storing tanks, said plurality of receiving pipes each comprising a first connecting joint, said first connecting joints being arranged in one line extending in a direction of an X-axis;

a plurality of material feeding pipes connected respectively to a plurality of solution preparing/mixing devices, said plurality of feeding pipes each comprising a second connecting joint;

a holder for holding at least one of the second connecting joints of said material feeding pipes; and means for moving said holder in a direction of a Z-axis transverse to the direction of the X-axis and in the direction of the X-axis, in which device the second connecting joints of said material feeding pipes are held by said holder at a standby region such that the second connecting joints are arranged in one line in the direction of the Z-axis, said material feeding pipes each comprise a rigid pipe extending in a direction of a Y-axis transverse to the direction of the X-axis and to the direction of the Z-axis, a first flexible hose extending in the direction of the Z-axis, and a second flexible hose extending in the direction of the X-axis, and wherein said rigid pipes, said first flexible hoses and said second flexible hoses are fluidly connected, in the stated order, to a respective one of the second connecting joints of said material feeding pipes, free ends of said second flexible hoses being connected to respective ones of the solution preparing/mixing devices, said rigid pipes are arranged in the standby region and made larger in length with increasing distance from an origin of the X-axis, the Y-axis and the Z-axis to prevent interference of said first and second flexible hoses with each other, said means for moving moves said holder to the standby region, where said holder holds the second connecting joint of a selected one of said material feeding pipes, and then moves said holder in the direction of the X-axis and in the direction of the Z-axis to the first connecting joint of a selected one of said material receiving pipes, for connecting the first and second connecting joints to each other.

2. An automatic pipeline switching device as claimed in claim 1, wherein said means for moving repeatedly moves said holder to connect and disconnect selected ones of said first and second connecting joints, and wherein said means for moving selects successive ones of said material feeding pipes for connection with said material receiving pipes beginning with a material feeding pipe comprising a shortest one of said rigid pipes which is located closest to the origin in the direction of the Z-axis.

3. An automatic pipeline switching device as claimed in claim 1 or 2, wherein the number of said material storing tanks is from 20 to 60.

4. An automatic pipeline switching device as claimed in claim 3, wherein the number of the combination of said material feeding pipes and said material receiving pipes is from 50 to 100.

5. An automatic pipeline switching device as claimed in claim 1 or 2, wherein the materials stored in the material storing tanks are materials for photographic products.

* * * * *